Figures 1, 2:
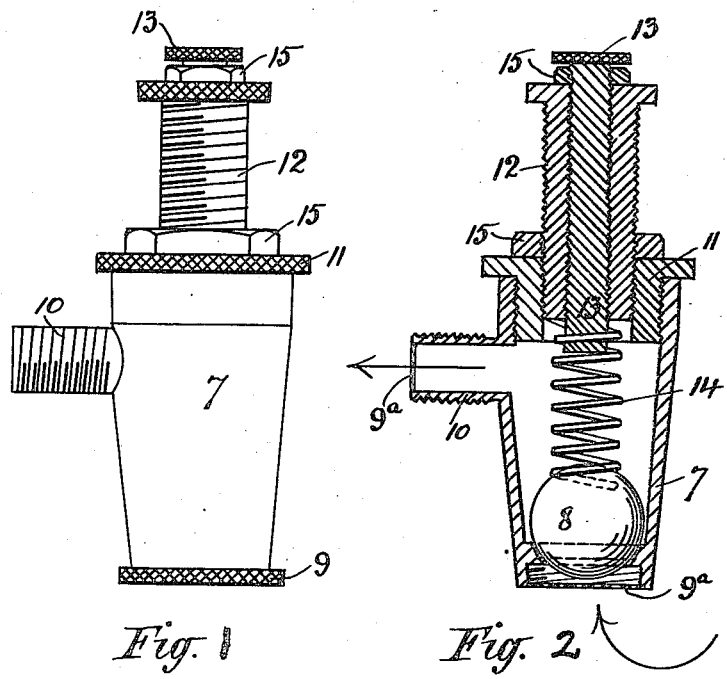

D. J. WILSON.
VALVE.
APPLICATION FILED APR. 9, 1913.

1,151,230.

Patented Aug. 24, 1915.

WITNESSES

INVENTOR
D. J. WILSON
ATTORNEY

UNITED STATES PATENT OFFICE.

DUDLEY JOHN WILSON, OF MELBOURNE, VICTORIA, AUSTRALIA.

VALVE.

1,151,230.	Specification of Letters Patent.	Patented Aug. 24, 1915.

Application filed April 9, 1913. Serial No. 759,991.

*To all whom it may concern:*

Be it known that I, DUDLEY JOHN WILSON, a subject of the King of Great Britain, residing at Federal Government House, Melbourne, Victoria, Australia, have invented certain new and useful Improvements in Valves, of which the following is a specification.

My invention relates to spring pressed check valves and has for its object to produce a highly efficient valve of this type which may be easily adjusted for varying conditions of use.

In the accompanying drawing Figure 1 is a side elevation of the valve, and Fig. 2 is a central vertical sectional view of the same.

The valve comprises a main part or body 7 wherein is a seat for a ball 8. The lower end of the valve is closed by a cap piece 9 and is provided with a filter $9^a$ of gauze through which the incoming air will pass and which will serve to prevent foreign matter and dust getting into the valve. A like filter may, if necessary, be attached to the delivery 10.

Adapted to screw into the body portion of the valve is a cap 11 which is bored and provided with a female thread with which meshes the regulator stem 12. This latter part is also bored and screwed to take the set screw 13 the function of which will presently be explained.

The member 11 is mainly used to support the part 12 while 12 carries the set screw 13. The last mentioned member will slightly project from the lower end of 12 in order to support the helical spring 14 that is in compression between 13 and the ball 8. Suitable lock nuts 15 are provided to hold members 13 and 12 in position after being adjusted.

The regulator stem piece 12 presses upon the compression spring 14 the other end of which rests on the ball 8. The spring being thus in compression between the piece 12 and the ball, can be regulated as to its tension by screwing down or easing up the part 12.

It is necessary to provide means whereby the spring 14 may be held in a vertical position on the ball 8 and any suitable device for the purpose may be used. To this end, I have caused the screw 13 to project into the spring as shown in Fig. 3. In addition to performing the supporting function the projecting member 13 will prevent the ball from ever rising far enough to interfere seriously with the delivery of air through 10.

Having now described my invention what I claim as new and desire to secure by Letters Patent is:—

1. In combination, a body portion; a valve seated therein; a helical spring pressing on said valve; a regulating stem screwed in the body portion and pressing on the spring; a jam nut on said stem; a set-screw screwed in the stem and engaging in the spring; and a jam nut on the stem.

2. In combination, a body portion having a seat therein; a valve on said seat; a helical spring pressing on said valve; a cap piece screwed in the upper part of the body portion; a regulating stem engaging in the cap piece and pressing on the spring; a jam nut on the stem and engaging the cap piece; a set screw passing through the regulating stem and into the helical spring; and a jam nut on said set screw and engaging the regulating stem.

3. In combination, a body portion having a seat therein; a spherical valve on said seat; a helical spring pressing on said valve; a cap piece screwed in the upper part of the body portion; a regulating stem screwed in the cap piece and pressing on the spring; and a set screw passing entirely through said stem and engaging within the helical spring to hold it on said stem.

4. In combination, a body portion having a seat therein; a spherical valve on said seat; a helical spring pressing on said valve; a regulating stem screwed in the upper part of the body and pressing on said spring; and a set screw longer than said stem and passing therethrough and engaging within the spring to hold it in alinement with said stem.

In testimony whereof I have affixed my signature in presence of two witnesses.

DUDLEY JOHN WILSON.

Witnesses:
P. M. NEWTON,
A. C. SMITH.